United States Patent [19]
Franaszek et al.

[11] Patent Number: 5,522,032
[45] Date of Patent: May 28, 1996

[54] RAID LEVEL 5 WITH FREE BLOCKS PARITY CACHE

[75] Inventors: Peter A. Franaszek, Mt. Kisco; John T. Robinson, Yorktown Heights; Alexander Thomasian, Pleasantville, all of N.Y.

[73] Assignee: International Business Machines Corporation, Armonk, N.Y.

[21] Appl. No.: 238,769

[22] Filed: May 5, 1994

[51] Int. Cl.$^6$ .............................. G06F 11/34; G06F 11/10
[52] U.S. Cl. ...................................... 395/182.04; 371/51.1
[58] Field of Search .................................... 395/575, 425, 395/181, 182.03, 182.04, 185.01, 440, 441; 371/49.1, 49.2, 51.1, 10.1

[56] References Cited

U.S. PATENT DOCUMENTS

| | | | |
|---|---|---|---|
| 4,419,725 | 12/1983 | George et al. | 364/200 |
| 5,124,987 | 6/1992 | Milligan et al. | 371/10.1 |
| 5,233,618 | 8/1993 | Glider et al. | 371/68.1 |
| 5,274,799 | 12/1993 | Brant et al. | 395/575 |
| 5,309,451 | 5/1994 | Noya et al. | 371/40.4 |
| 5,315,602 | 5/1994 | Noya et al. | 395/575 |
| 5,333,305 | 7/1994 | Neufeld | 395/575 |
| 5,341,381 | 8/1994 | Fuller | 371/10.1 |
| 5,359,611 | 10/1994 | Parks et al. | 371/40.4 |
| 5,373,512 | 12/1994 | Brady | 371/40.1 |
| 5,392,244 | 2/1995 | Jacobson et al. | 371/21.1 |
| 5,410,667 | 4/1995 | Belsan et al. | 395/425 |

FOREIGN PATENT DOCUMENTS

| | | | |
|---|---|---|---|
| 0481759A2 | 10/1991 | European Pat. Off. | G11B 20/10 |
| A0569755A1 | 11/1993 | European Pat. Off. | G06F 12/08 |
| A0854804 | 3/1994 | European Pat. Off. | G11B 20/12 |
| A9313478 | 7/1993 | WIPO | G06F 11/10 |

OTHER PUBLICATIONS

"A Case for Redundant Arrays of Inexpensive Disks (RAID)" ACM Sigmod International Conf on Management Data 1988 pp. 109–116 Patterson et al.
"Performance of Disk Arrays in Transaction Processing Environments" Proc. of Internat'l Conf on Distributed Computing Sys. Menon et al.
"The Design & Implementation of a Log–Structured File System" ACM Sigmod Intern'l Conf. 1991 pp. 1–15 Rosenblum et al.
"Parity Logging Overcoming the Small Write Problem . . . " IEEE 1993 D. Stodolsky pp. 64–75.
"The Architecture of a Fault–Tolerant Cached RAID Controller" IEEE 1993 pp. 76–86 Jai Menon et al.
"IBM Res. Rpt" The Architecture of a Fault–Tolerant Cached RAID controller J. Menon et al Jan. 22, 1993.
"LRAID: Use of Log Disks for an Efficient RAID Design" IBM TDB vol. 37, No. 02A Feb. 1994 A. Bhide et al pp. 19–20.

Primary Examiner—Robert W. Beausoliel, Jr.
Assistant Examiner—Albert Decady
Attorney, Agent, or Firm—Robert P. Tassinari, Jr.

[57] ABSTRACT

A system for writing data to a disk array includes a cache memory coupled to the disk array for storing data indicative of locations on the disk array and parity blocks associated with parity groups including the locations. Each of the parity blocks includes an identifier indicative of locations within a particular parity group which are protected by the parity data. Write logic reads the identifier from the parity block, and based thereon, determines whether a disk location is not protected by the parity data. The write logic also writes to the location and updates the parity data and the identifier associated with the parity block to include the location of the data block to indicate that the location is protected.

16 Claims, 7 Drawing Sheets

RAID LEVEL 5 WITH FREE BLOCKS PARITY CACHE

BACKGROUND OF THE INVENTION

1. Field of the Invention

This invention relates generally to permanent storage systems for digital information, especially those of the disk type, and more particularly to disk array systems which create and store parity blocks in order to facilitate recovery from a disk failure.

2. Related Art

A Redundant Array of Inexpensive Disks (RAID) has been proposed as a low cost alternative to a Single Large Expensive Disk (SLED) for providing large storage of digital information with high throughput. The theory of RAID is to use relatively inexpensive disks, which may individually have a higher chance of failure than more expensive disks, and compensating for this higher failure rate by adding redundancy by creating and storing parity blocks to facilitate recovery from a disk failure.

FIG. 1A shows a disk array subsystem architecture on which a RAID organization can be implemented. A disk controller 30 connected to a host system 10, and having a cache 31 manages an array of inexpensive disks 40–43. In a RAID organization with a total of N+1 disks, one parity block is created for each N data blocks, and each of these N+1 blocks (N data blocks plus one parity block) is stored on a different disk. In one implementation, a parity block is computed from the N data blocks by computing a bitwise "Exclusive Or" (XOR) of the N data blocks. The parity block along with the N data blocks from which that parity block was computed are called a parity group. Any block in a parity group can be computed from the other blocks of that parity group.

In "A Case for Redundant Arrays of Inexpensive Disks (RAID)", *Proc. of ACM SIGMOD International Conference on Management of Data*, pp. 109–116, 1988, incorporated herein by reference, D. A. Patterson, G. Gibson and R. H. Katz describe five types of disk arrays classified as RAID levels 1 through 5. Of particular interest are disk arrays with an organization of RAID level 5, because the parity blocks in such a RAID type are distributed evenly across all disks, and therefore cause no bottleneck problems.

One shortcoming of the RAID environment is that a disk write operation is far more expensive than on a SLED, because a data write on RAID requires as many as four disk access operations as compared with two disk access operations on a SLED. Whenever the disk controller in a RAID organization receives a request to write a data block, it must not only update (i.e., read and write) the data block, but it also must update (i.e., read and write) the corresponding parity block to maintain consistency. For instance, if data block D1 in FIG. 2A is to be written, the new value of P0 is calculated as:

new $P0$=(old $D1$ XOR new $D1$ XOR old $P0$)

Therefore, the following four disk access operations are required: (1) read the old data block D1; (2) read the old parity block P0; (3) write the new data block D1; and (4) write the new parity block P0. The reads must be completed before the writes can be started.

In "Performance of Disk Arrays in Transaction Processing Environments", *Proc. of International Conference on Distributed Computing Systems*, pp. 302–309, 1992, J. Menon and D. Mattson teach that caching or buffering storage blocks at the disk controller can improve the performance of a RAID disk array subsystem. If there is a disk cache, the pre-reading from the disk array of a block to be replaced can be avoided if the block is in the cache. Furthermore, if the parity block for each parity group is also stored in the cache, then both reads from the disk array can be avoided if the parity block is in the cache.

Commonly assigned and co-pending U.S. patent application 07/017,920, filed Feb. 16, 1993 (IBM Docket Y0993-013), describes a system wherein parity blocks from high write activity parity groups are stored in a cache buffer in order to reduce the number of disk accesses during updating.

A drawback of prior schemes is that at any given time, various data blocks within a given parity group may not contain useful data. For example, some of the data blocks may not have been used, while others, although previously used, may have been freed by the operating system. Thus, while each parity block is assigned to a group of data blocks, each parity block bit depends on all corresponding data block bits, regardless of whether the data block is in use.

SUMMARY OF THE INVENTION

The present invention eliminates the drawbacks discussed above. The present invention is a system for writing data to a disk array wherein a parity block can provide parity information either for all data blocks within its parity group or for any arbitrary subset of these data blocks. This allows parity information to be stored only for data blocks that are currently in use. The system includes a cache memory coupled to the disk array for storing parity blocks associated with parity groups comprising respective locations. In accordance with the present invention, each of the parity blocks includes an identifier indicative of data blocks within a particular parity group which are protected by the parity data. Write logic, coupled to the cache memory and the disk array, includes means for reading the identifier and determining whether a destination block is not protected by the parity data. The write logic also includes write means for writing to the unprotected location and update means for updating the parity data and the identifier associated with the parity block including the location, to indicate that the location is protected.

BRIEF DESCRIPTION OF THE DRAWINGS

The present invention will be better understood by reference to the drawings, in which.

DETAILED DESCRIPTION OF THE PREFERRED EMBODIMENT

Figure 1A:
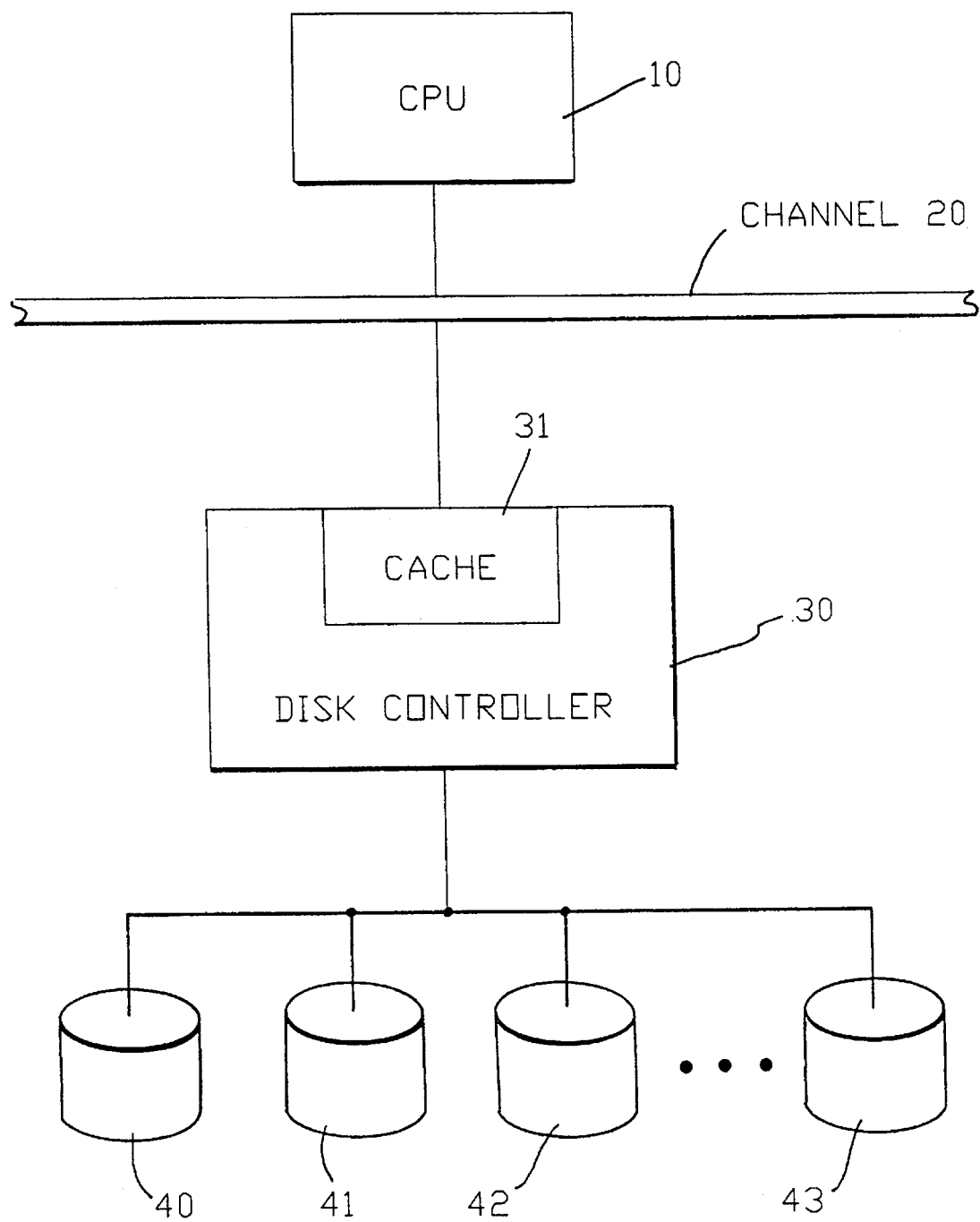
FIG. 1A is a block diagram illustrating the architecture of a disk array subsystem.
Figure 1B:
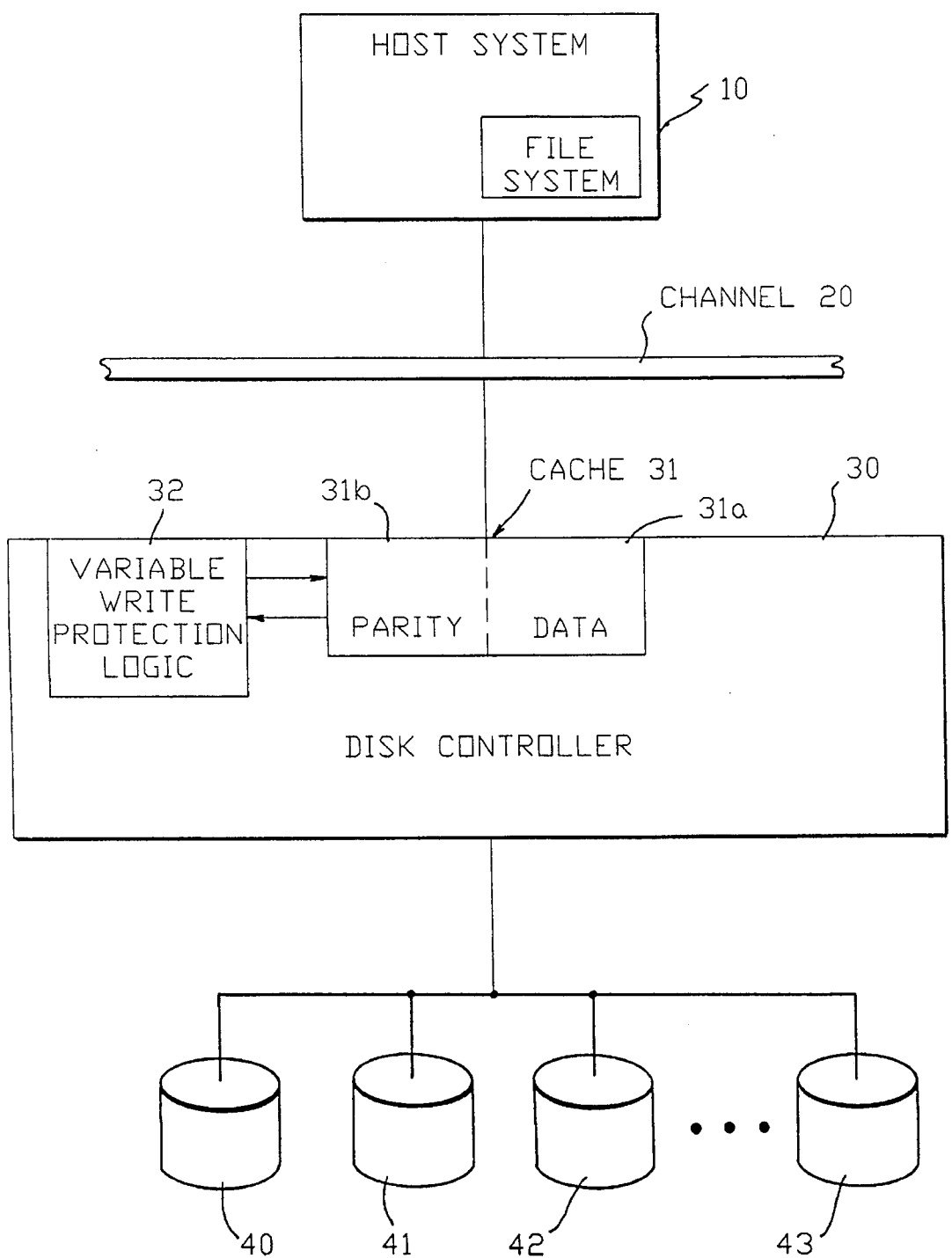
FIG. 1B is a block diagram illustrating the architecture of a disk array subsystem in which the present invention is implemented.

The present invention may be practiced on the disk array subsystem shown in FIG. 1B, which includes a disk controller 30 having a cache memory 31 and an array of disks 40, 41, 42, and 43. The cache memory 31 is divided into two partitions: a data partition 31a for buffering data blocks and a parity partition 31b for buffering parity blocks. The data partition 31a and the parity partition 31b are independently accessible by the cache controller. In accordance with an embodiment of the present invention, data block writes are performed under control of variable write protection logic 32, which is connected to both partitions 31a and 31b of the cache 31. The data mapping in the disk array 40–43 of the preferred embodiment to be described is a RAID level 5 (RAID V) mapping.

Figure 2A:
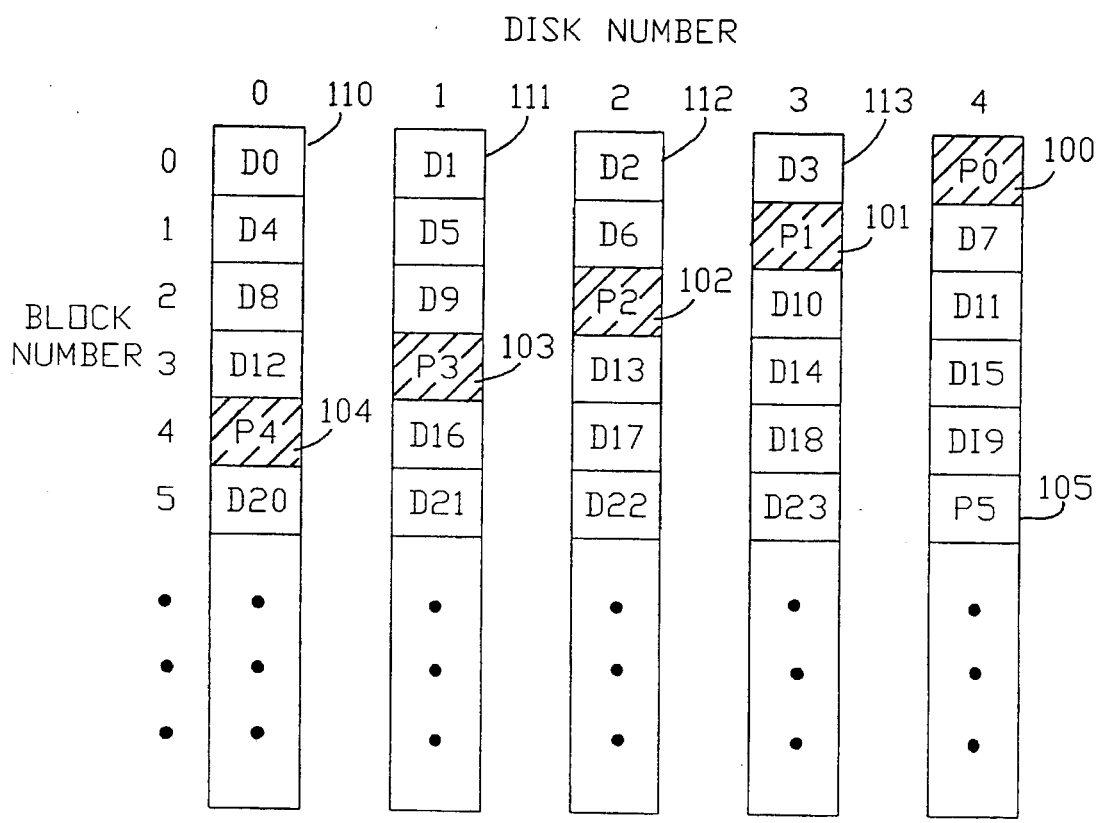
FIG. 2A is a conventional RAID level 5 data mapping showing the placement of data and parity blocks.
Figure 2:
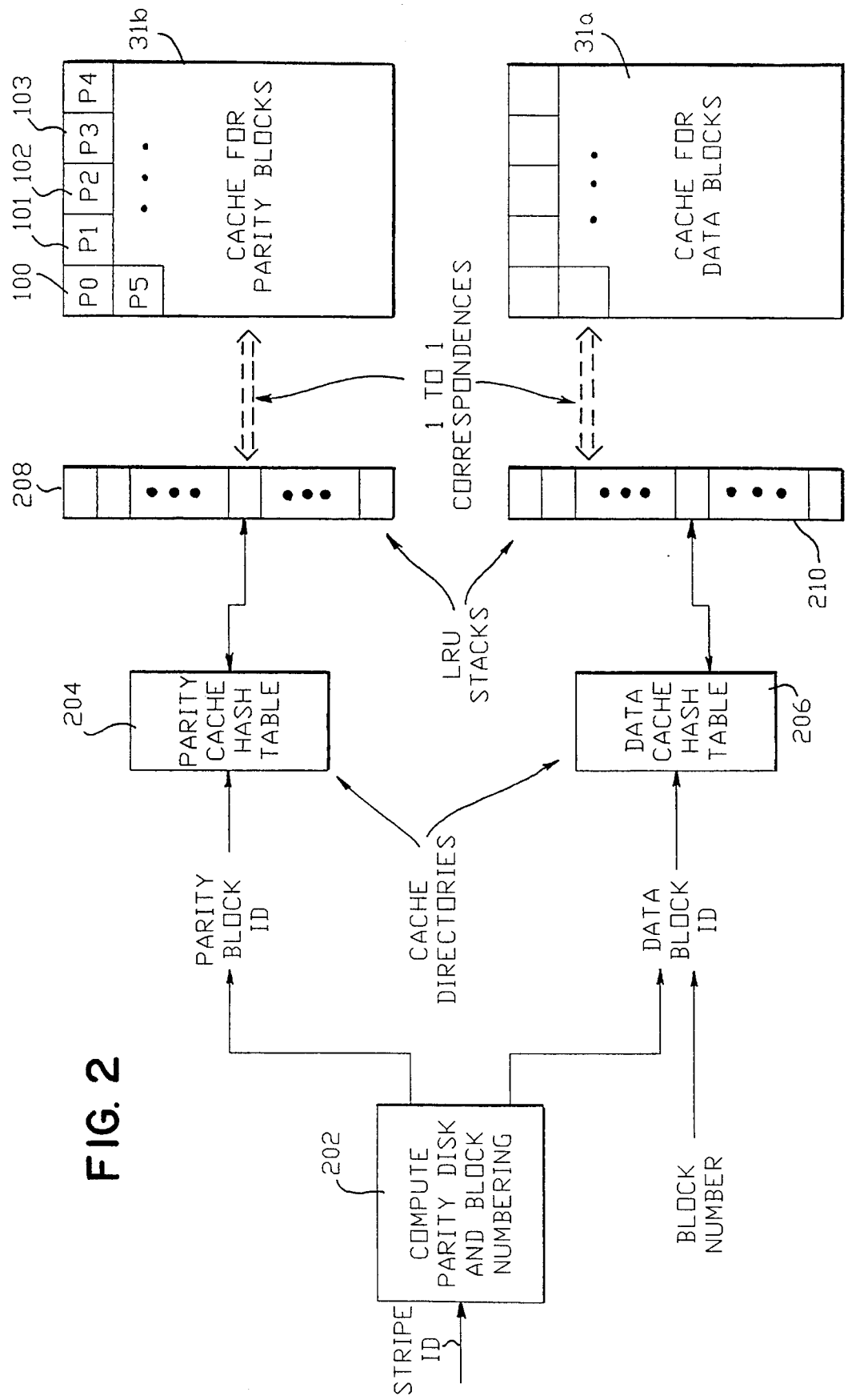
FIG. 2 is a partitioned parity/data disk cache.

FIG. 2 represents the data structures used by the disk controller 30 for its caches 31a and 31b. When block 202 is given a stripe's ID, RAID V determines which disk has the parity and the numbering of data blocks on the other disks. The disk controller then works with real disk addresses. Cache directories 204 and 206 are implemented as hash tables, one for the parity cache and one for the data cache. Given a disk block address, the hash table is consulted to determine whether or not the data having the address is in the cache, and if it is in the cache, where it is. A hash table entry for a block in the parity cache points to a least recently used (LRU) stack 208. The address of the LRU stack entry determines where the actual data is, since there is a one-to-one correspondence between LRU stack entries and cache blocks. To compute the address of data, use (cache space base address)+(block size)* (LRU stack entry address−LRU stack base address)/(LRU stack entry length). LRU stack 210 entries have a data block address field.

In operation, each cache is used in the following way: (1) each time a parity/data block is accessed, it is moved from its current position to the most recently used (MRU) position in the LRU stack; (2) when space is needed to read-in a parity/data block, the cache space for the LRU block is freed, the block is read into this location, placed at the MRU position, and the cache directory is updated accordingly.

In a preferred embodiment, an LRU stack is implemented as a doubly-linked list, or chain, of fixed size entries. Each entry may have information about the object for which it is a LRU stack. In this case, a pointer to the cache block is unnecessary if address computation techniques are used. Each entry may also have information about two pointers, one to the next MRU entry (or NIL if it is the MRU entry) and one to the next LRU entry (or NIL if it is the LRU entry). The LRU stack can be implemented in software, since entries can be moved anywhere out of the middle of the stack and then put on the top of the stack with a few instructions.

FIG. 2A shows a RAID level 5 data mapping. In a RAID level 5 system with a total of N+1 disks, each parity group includes N data blocks and a parity block. The traditional approach is to divide data blocks into parity groups, such as that shown in FIG. 2A. In FIG. 2A, for example, data blocks D0, D1, D2 and D3 and parity block P0 form a parity group. In FIG. 2A parity blocks are labelled 100, 101, 102, 103, and 104. Parity block P0 (labelled 100), therefore, is the XOR of data blocks D0 (labelled 110), D1 (labelled 111), D2 (labelled 112), and D3 (labelled 113). In accordance with the present invention, for each data block update request from the host system 10 to the disk controller 30, if the corresponding parity block is already in the control unit cache 31, three physical disk access operations are required for a data update: 1) read the old data; and 2) write the new data; 3) write the new parity block.

In accordance with an embodiment of the present invention, each of the parity blocks includes an identifier, or "prefix", which indicates which of the data blocks in the parity group are protected. When the host system 10 sends a write command to the disk controller 30, variable write protection logic 32 reads the prefix from the relevant parity block in the cache memory 31. In instances where the parity block prefix associated with a parity group (or "stripe") to be written-to indicates that a particular data block is not protected by the parity, the old parity is XOR'ed with the new data block, the prefix is updated to indicate that the data block is protected, the new data is written to the data block on disk, and the new parity block is written to disk. Thus, the step of reading the old data from the disk is avoided completely.

Figure 3:
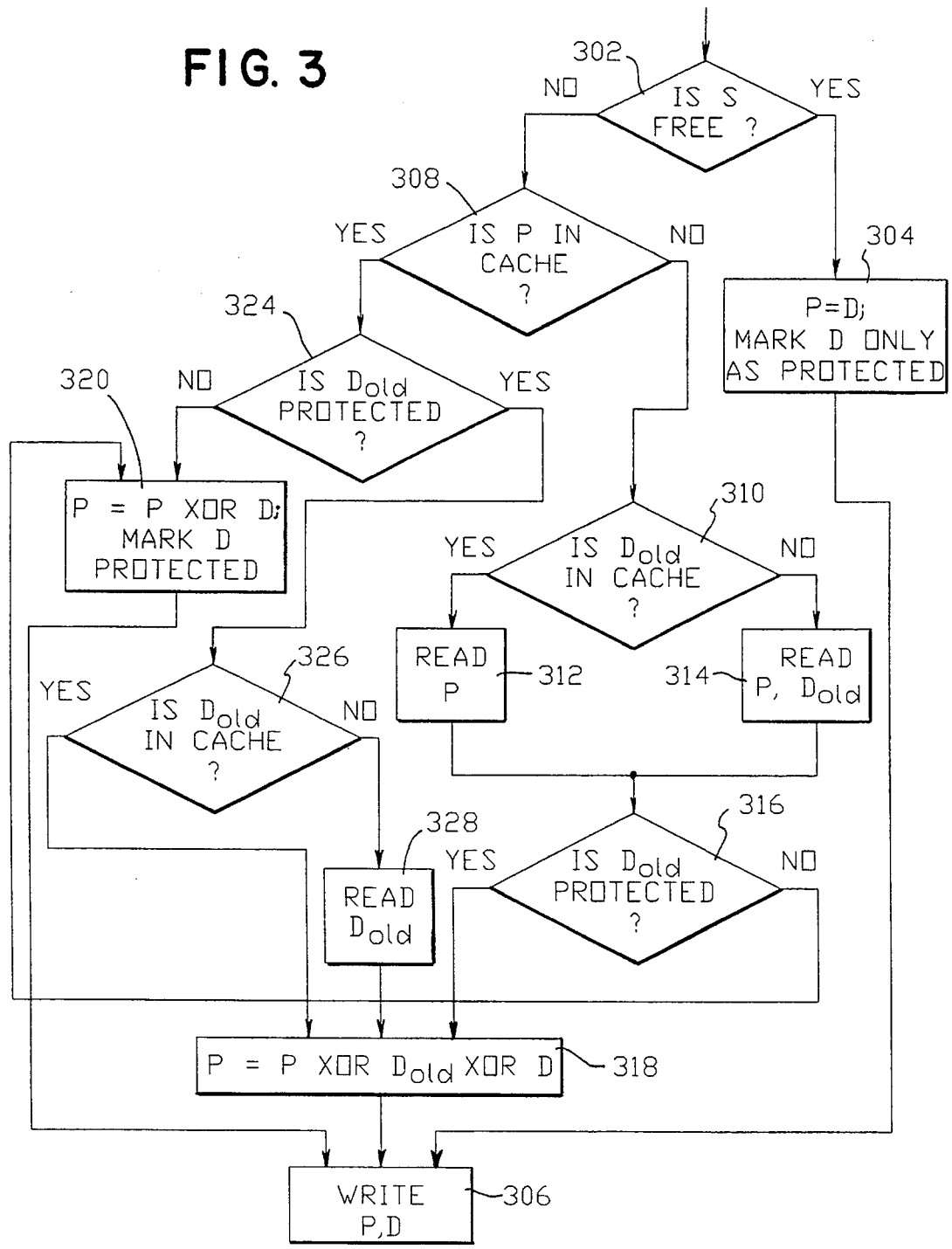
FIG. 3 is a flow chart of a single block write according to an embodiment of the present invention.

A flow chart of the variable protection single block write logic 32 in accordance with the invention is illustrated in FIG. 3. This variable protection write logic 32 can be embodied as a microcode control program executing on the disk controller's microprocessor.

The logic starts when the disk controller receives a write command from the host processor 10. The write command includes the data block, and the write address. Also included in the write command is a flag, set by the host file system, which indicates whether the entire stripe consists of free (i.e., unused) space.

In step 302 the disk controller examines the free stripe flag to determine whether the entire stripe to which the data block belongs is free. If the entire stripe is free, in step 304 the disk controller sets the stripe's parity block P equal to the data block D (P=D). Also, data block D is marked as protected in the free blocks bit vector. It is noted that this operation requires no reads from the cache or disk. In step 306 the controller writes P and D to the disk.

If, in step 302, the disk controller determines that the entire stripe is not free, in step 308 the controller determines if the parity block P is in the cache 31 by means of hash table 304. If not, in step 310 the controller determines if the data block being replaced ($D_{old}$) is in the cache 31. If yes, in step 312 the controller reads P from the disk. If not, in step 314 the controller reads both P and $D_{old}$ from the disk.

Next, in step 316 the controller examines the parity block prefix to determine whether $D_{old}$ is protected. If yes, in step 318 the controller determines the new value for the parity P as P= P XOR $D_{old}$ XOR D. Then, in step 306, P and D are written to the disk. If $D_{old}$ is not protected, in step 320 the new value for P is determined as P= P XOR D and D is marked as protected in the block prefix. Then, in step 306, P and D are written to the disk.

If in step 308 it is determined that P is in the cache, in step 324 the controller examines the parity block prefix to determine whether $D_{old}$ is protected. If yes, in step 326 the disk controller determines whether $D_{old}$ is in the cache. If yes, steps 318, and 306 are performed. If not, $D_{old}$ is read from the disk in step 328 and then steps 318 and 306 are performed.

If from step 324 it is determined that $D_{old}$ is not protected, in step 320 the controller determines the new parity value as P=P XOR D and then marks D as protected. Then step 306 is performed. It is noted that in step 320 all values are taken from the cache and thus no reads are required from the disk.

Figure 4:
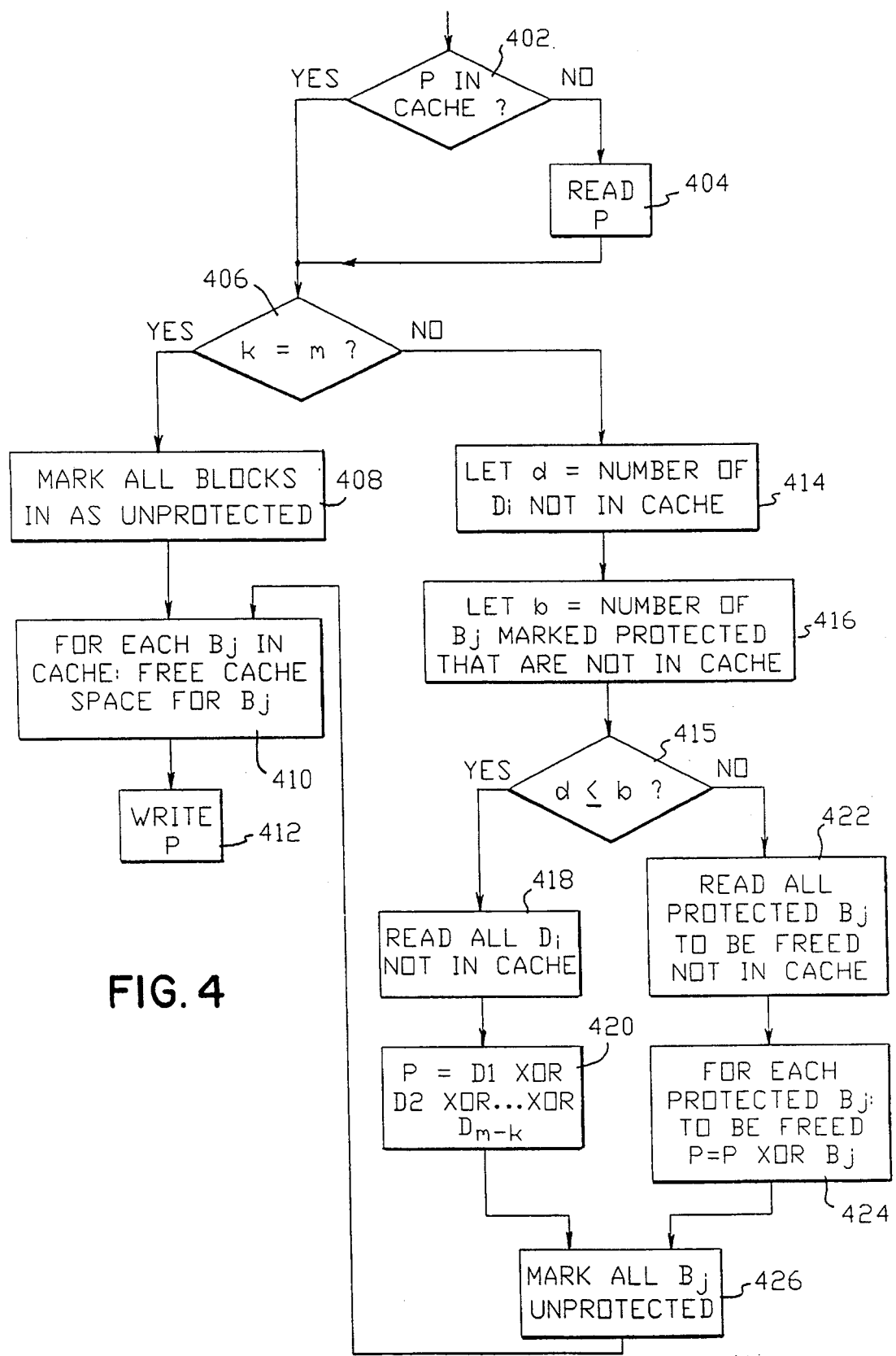
FIG. 4 is a flow chart of a free blocks command according to an embodiment of the present invention.

In a preferred embodiment, disk space is managed by a component of the host operating system known as the file system. The file system is responsible for mapping logical entities known as files and directories to physical space on disk, and for managing the free (unused) disk space. For example, when it is necessary to create a new file, or to extend an existing file, the file system may allocate existing free space for this purpose, so that the free space becomes non-free (i.e., in use). Conversely, when files are deleted, or when the space necessary to store a file decreases, previously in-use space may become free. In order to optimize the performance of disk writes to free space, and in order to speed recovery after a disk failure, it is desirable that free disk blocks be unprotected. For this purpose, a "Free Blocks Command" is provided to the disk controller, the logic of which is shown in FIG. 4. This command can be issued by the file system, for example, either whenever previously in-use space is made free in any given stripe S, or else in batches (a batch consisting of one command for each stripe containing protected free space which it is desired to make unprotected), periodically, as determined by a given time interval, or by a threshold amount of protected free space having accumulated, etc.

The "Free Blocks Command" of FIG. 4 operates as follows: First, in step 402 the cache maintenance program determines if P is in the cache. If not, in step 404 P is read from disk into the cache. Next, in step 406, the program determines whether the number of blocks to be freed (k) is equal to the number of blocks in the stripe (N) (not counting P). If the entire stripe (except for P) is to be freed, in step 408 all of the data blocks are marked unprotected. In step 410, each of the blocks Bj to be freed which are stored in cache is marked as free cache space. Then in step 412, the new parity block is written to the disk.

If less than the entire stripe of data blocks is to be freed, then in step 414 the number of in-use data blocks (d) which are not stored in cache is determined. d is the number of data blocks that have to be read from disk to compute parity by XORing all in-use data blocks. In step 416, the number b of protected data blocks to be freed that are not in the cache is determined. b is the number of blocks that need to be read from the disk if parity is recomputed by subtracting out the protected blocks that are becoming unprotected.

Next, in step 415 it is determined whether d is less than or equal to b. The purpose of this step is to do the minimum number of I/O operations of the two alternatives. If d is less than or equal to b, in step 418 all of the in-use data blocks not in the cache are read from disk and then in step 420 the parity is recomputed by XORing all of the data blocks D1 . . . Dn with one another. If, on the other hand, d is greater than b, in step 422 all of the protected data blocks not in the cache are read from disk and then in step 424 each data block Bj to be freed is XOR'ed with the parity block P. This operation subtracts the protected data blocks Bj to be freed out of the parity block.

In step 426, all of the blocks Bj being freed are marked as unprotected by clearing their entries in the relevant block prefix. Then, steps 410 and 412 are performed as previously described.

Figure 5A:
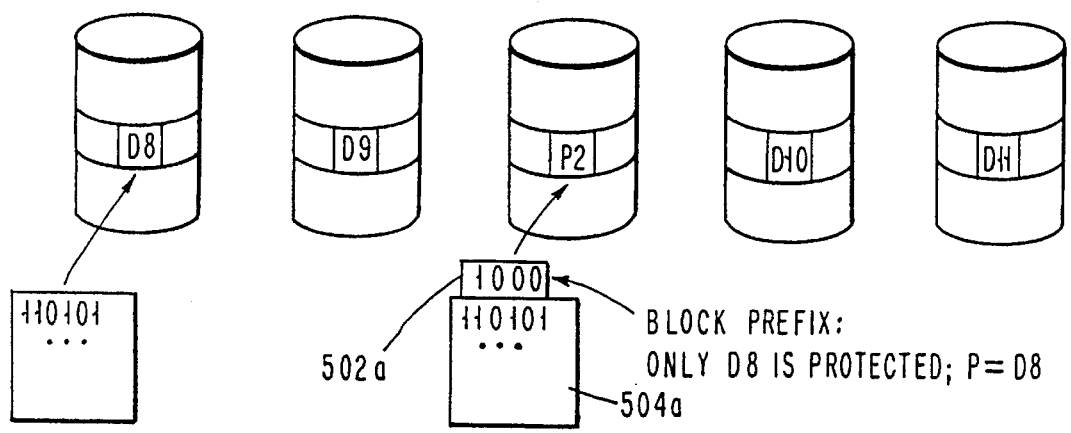
FIG. 5 is a block diagram describing the parity and identifier blocks of the present invention.
Figure 5B:
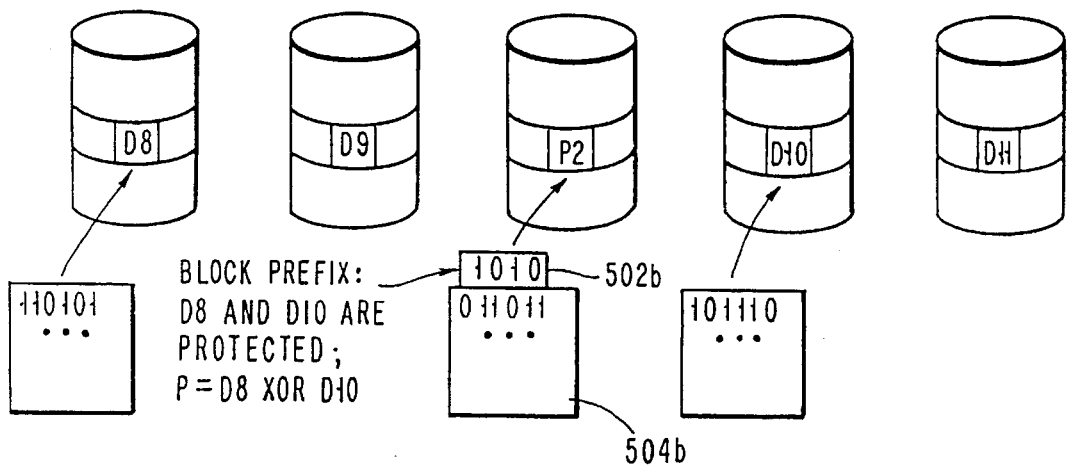
Figure 5C:
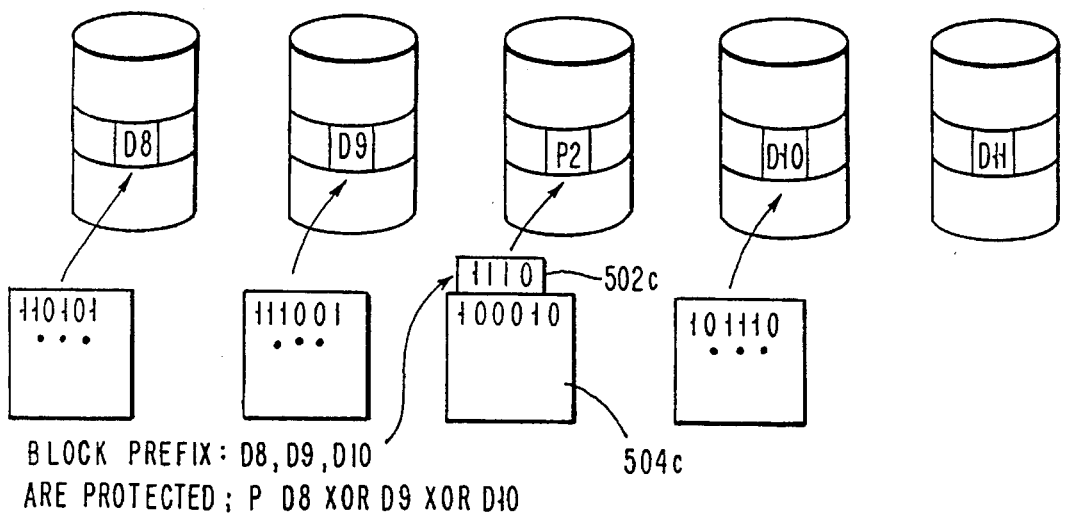

FIGS. 5A–5C show some examples of how parity is determined using a parity block prefix 502 in accordance with the present invention. An embodiment having four data blocks and one parity block per stripe (parity group) is shown. The prefix is mapped such that each data block Dn has a position in the prefix. A zero indicates that the respective data block is not included in the parity calculation, and a 1 indicates that the data block is included in the parity calculation.

In FIG. 5A, data blocks D9, D10 and D11 are free, thus only data block D8 is protected by the parity block P2. The prefix 502a is set to 1000 (binary) to indicate that the parity bits 504a of parity block P2 were generated only from block D8. The three zeros indicate that the remaining three data blocks are unprotected.

In FIG. 5B, it is assumed that the controller needs to perform a write to block D10. By examining the old parity block prefix 502a the controller determines that only block D8 is protected by the parity bits, and thus the new parity is calculated as P=D8 XOR D10, or P= D10 XOR old P, and is stored in parity block 504b.

In FIG. 5C, it is assumed that the controller needs to perform a write to block D9. The old parity 502b indicates that block D9 is not protected. Thus, the new parity is calculated as P=D8 XOR D9 XOR D10, or P= D9 XOR old P. P is stored in parity block 504c, and prefix updated as shown in 502c.

With the RAID 5 with free blocks parity system of the present invention, if a disk in the disk array fails, the recovery scenario is the same as that of a standard RAID disk array. The missing block in each parity group having a block on the failed disk is derived from the other blocks of its parity group on other disks. An advantage during recovery, however, is that in the present system the prefix provides a map of the data blocks described by the parity block. Reconstruction of unused data blocks, therefore, is unnecessary.

In the event of a single disk failure, the contents of the disk in prior RAID architecture disk systems can be reconstructed. Essentially, for each block of the failed disk, if it is a parity block, then the parity information is re-computed, and if it is a data block, then its contents can be reconstructed using all other data blocks in the stripe, together with the parity block for the stripe.

Using the variable stripe protection scheme of the current invention, reconstruction takes place as follows. First, suppose the block on the failed disk is a data block. From the parity block for the stripe, it can be determined if the block is protected or unprotected. If it is protected, then its contents are reconstructed as described above, except that only the other protected data blocks (together with the parity block) in the stripe are used. If only a few other blocks are protected, this results in I/O savings (as compared to prior art methods), and hence faster disk recovery, with increasing savings for fewer protected blocks in each stripe. The other case is that the data block is unprotected. In this case, no further action is necessary, which clearly is a large improvement over prior art methods. In particular, note that if the failed disk contains large amounts of unprotected (free) space, disk recovery will be extremely fast as compared to the prior disk reconstruction methods.

Next, suppose the block on the failed disk is a parity block. In this case there are two methods for reconstructing the block. First, if it is desired to have the disk reconstruction proceed independently of a host system, then it is necessary to make the worst-case assumption that all data blocks in the stripe are valid (in-use) blocks. In this case, the parity block is found by computing the parity of all data blocks in the stripe, and furthermore, all data blocks are marked as protected in the parity block prefix area.

A second method, which involves communication with a host system, is as follows. For each parity block on the failed disk, the disk controller queries a host file system for the status (free or in-use) of the data blocks in the stripe. The host file system returns a bit-vector indicating, for each block in the stripe, whether it is free. Each such free block is marked as unprotected, and the other data blocks in the stripe are marked as protected. Finally, parity is computed for the protected blocks in the stripe, thus reconstructing the parity block on the failed disk. If fewer than all of the data blocks are protected in a stripe, this also is an improvement over prior methods, since only the protected blocks need to be read from disk to recompute the parity block.

In summary, the present invention reduces the number of required reads and writes when fewer than all data blocks within a stripe are protected by the parity block. Specifically, the parity blocks include identifiers which classify each data block as being either: protected data, i.e., data for which parity information has been computed and stored in the parity block; or unprotected data, i.e., data for which there is no stored parity information. A data block in the latter category should always be a block that is not in use. Additionally, data blocks in the first (protected) category may be further classified as being in use or not in use. The case in which a protected data block contains data that is not in use may arise, for example, when information in the given block is updated and written to another disk location, or when the information becomes obsolete and the disk space containing the data is freed by the operating system. Writes to unprotected data blocks are performed without first determining the current block contents, as these are not included in the current parity information. Further, data blocks that are protected, but not in use, can be converted to unprotected blocks by recomputing parity information for the in-use data blocks. In a preferred embodiment, the system utilizes a cache memory whose contents include a number of data and parity blocks, as well as write logic which reads and modifies prefixes in parity blocks so as to determine the actions required for reading and writing blocks of each type.

While the invention has been particularly shown and described with reference to preferred embodiments thereof, it will be understood by those skilled in the art that various changes in form and details may be made therein without departing from the spirit and scope of the invention.

Having thus described our invention, what we claim as new, and desire to secure by Letters Patent is:

1. A system for writing data to a disk array, comprising:
   a cache memory coupled to the disk array, the cache memory storing one or more parity blocks associated with stripes of disk data blocks, each parity block including parity data for one or more data blocks in its stripe and an identifier identifying protected data blocks in its stripe; and
   write logic coupled to the cache memory and the disk array, the write logic including:
   means for determining whether or not a location is protected by the parity data;
   means for writing data to a selected location;
   means for computing new parity data and updating the identifier associated with the new parity data if necessary to indicate that the selected location is protected.

2. The system according to claim 1, further comprising:
   means for reading from the disk array a block of data after it has been freed; and
   means for recomputing parity data and updating the identifier associated with the recomputed parity data to reflect the freeing of the block of data.

3. The system according to claim 2, including means for reading from the disk array a block of data as it is freed.

4. The system according to claim 2, further comprising means for determining an optimal set of blocks to read from disk so as to recompute the parity data.

5. The system according to claim 2, further comprising means for reading from the disk array a plurality of blocks of data after they have been freed.

6. A method of writing new data to disk in a redundant array of inexpensive disks, comprising:
   storing the new data in a cache memory;
   computing a parity block only for in-use data blocks of a group of data blocks in the disk array;
   attaching to the parity block an identifier indicating which data blocks of the group of data blocks are in use;
   choosing a destination data block for the new data;
   determining whether the destination block belongs to a group of free data blocks, and if so, setting the parity block using only the new data, and writing the set parity block and the new data to disk; otherwise, determining from the identifier whether the destination block is protected by the parity block;
   if so, using the new data, the destination block and the parity block to compute a new parity block reflecting the new data and writing the new parity block to cache and disk;
   if not, computing a new parity block reflecting the new data, writing the new parity block to cache and disk and updating the identifier to indicate that the destination block is now protected by the parity block.

7. The method of claim 6, wherein if the destination block is protected by the parity block and if the contents of the destination block are not stored in cache, reading the contents of the destination block from disk prior to computing the new parity block.

8. The method of claim 7, wherein the parity block and each of the blocks in the group of data blocks are stored on a different disk in the disk array.

9. The method according to claim 6, wherein if the parity block is not stored in cache, reading the parity block and the identifier from disk prior to the step of determining whether the destination block is protected.

10. The method of claim 6, wherein the new parity block is computed by XORing the new data block and the parity block.

11. A method of accounting for unused data blocks in a redundant array of inexpensive disks, comprising:
   computing a parity block for in-use data blocks in a group of data blocks stored on the disks;
   attaching to the parity block an identifier indicating which blocks of the group are the in-use data blocks;
   when a block is to be reclassified from in-use to unused, computing a new parity block using the parity block and the data in the block to be reclassified, and updating the identifier to indicate that the block to be reclassified is not in use.

12. The method according to claim 11, wherein the array has an associated cache memory, and wherein if the parity block and identifier are not stored in the cache memory, reading the parity block and identifier from disk prior to the step of computing a new parity block.

13. The method according to claim 11, wherein the array has an associated cache memory, and if the data block to be reclassified is not stored in the cache memory, reading the data block to be reclassified from disk prior to the step of computing a new parity block.

14. The method according to claim 11, wherein the identifier comprises a number of bits equal to the number of data blocks in the group, each bit corresponding to a different one of the data blocks in the group, and wherein the step of updating the identifier comprises changing the state of the bit corresponding to the block to be reclassified.

15. The method according to claim 11, wherein the parity block and each of the data blocks in the group are stored on a different disk in the array.

16. The method according to claim 11, wherein the step of computing a new parity block comprises XORing the parity block and the data in the block to be reclassified.

* * * * *